United States Patent
Yoda et al.

(10) Patent No.: US 9,452,777 B2
(45) Date of Patent: Sep. 27, 2016

(54) POWER-STEERING DEVICE

(71) Applicant: HITACHI AUTOMOTIVE SYSTEMS STEERING, LTD., Hiki-gun, Saitama (JP)

(72) Inventors: Toshiro Yoda, Higashimatsuyama (JP); Takuya Ishihara, Kumagaya (JP)

(73) Assignee: HITACHI AUTOMOTIVE SYSTEMS STEERING, LTD., Saitama (JP)

( * ) Notice: Subject to any disclaimer, the term of this patent is extended or adjusted under 35 U.S.C. 154(b) by 0 days.

(21) Appl. No.: 14/646,803

(22) PCT Filed: Nov. 18, 2013

(86) PCT No.: PCT/JP2013/080990
§ 371 (c)(1),
(2) Date: May 22, 2015

(87) PCT Pub. No.: WO2014/103556
PCT Pub. Date: Jul. 3, 2014

(65) Prior Publication Data
US 2015/0298728 A1    Oct. 22, 2015

(30) Foreign Application Priority Data

Dec. 28, 2012    (JP) ................................ 2012-286561

(51) Int. Cl.
*B62D 5/06*    (2006.01)
*H02K 1/28*    (2006.01)
(Continued)

(52) U.S. Cl.
CPC ............... *B62D 5/064* (2013.01); *B62D 5/04* (2013.01); *B62D 5/06* (2013.01); *B62D 5/083* (2013.01);
(Continued)

(58) Field of Classification Search
CPC ............ B62D 5/04; B62D 5/06; B62D 5/12; B62D 5/14; B62D 5/22; B62D 5/083; B62D 5/092; B62D 6/00; B62D 6/003; B62D 6/064; F16C 3/063; F16C 3/067; H02K 1/28; H02K 5/173; H02K 5/1732; H02K 7/06; H02K 11/00
USPC ......................................................... 180/422
See application file for complete search history.

(56) References Cited

U.S. PATENT DOCUMENTS

2012/0160594 A1*  6/2012  Yoda ...................... B62D 5/065
                                                                180/422

FOREIGN PATENT DOCUMENTS

FR         1437289 A1 *  7/2004  ............. B62D 1/187
JP         55-033805 U     3/1960
(Continued)

*Primary Examiner* — Joseph Rocca
*Assistant Examiner* — Felicia L Brittman
(74) *Attorney, Agent, or Firm* — Foley & Lardner LLP

(57) ABSTRACT

A power steering device is provided with a device body and a hollow motor. The device body has a steering system in which a piston is disposed on an output shaft via a ball screw mechanism so that a steering (rotational) torque is transmitted from an input shaft to the output shaft and converted to rotation of a sector shaft by axial movement of the piston for steering of steerable wheels. The hollow motor is connected to the outer circumference of the input shaft and driven by energization control based on driving support information from a vehicle-mounted camera and the like. A key and a key groove are provided on the outer circumference of the input shaft and the inner circumference of a rotor of the hollow motor, respectively, so as to constitute a key connection between the input shaft and the hollow motor.

20 Claims, 11 Drawing Sheets

(51) Int. Cl.
| | |
|---|---|
| H02K 5/173 | (2006.01) |
| H02K 7/06 | (2006.01) |
| B62D 5/09 | (2006.01) |
| B62D 5/04 | (2006.01) |
| B62D 6/00 | (2006.01) |
| F16C 35/063 | (2006.01) |
| F16C 35/067 | (2006.01) |
| H02K 11/00 | (2016.01) |
| B62D 5/083 | (2006.01) |
| B62D 5/12 | (2006.01) |
| B62D 5/14 | (2006.01) |
| B62D 5/22 | (2006.01) |

(52) U.S. Cl.
CPC ............... *B62D 5/092* (2013.01); *B62D 5/12* (2013.01); *B62D 5/14* (2013.01); *B62D 5/22* (2013.01); *B62D 6/00* (2013.01); *B62D 6/003* (2013.01); *F16C 35/063* (2013.01); *F16C 35/067* (2013.01); *H02K 1/28* (2013.01); *H02K 5/173* (2013.01); *H02K 5/1732* (2013.01); *H02K 7/06* (2013.01); *H02K 11/00* (2013.01)

(56) References Cited

FOREIGN PATENT DOCUMENTS

| | | | |
|---|---|---|---|
| JP | 03159876 A | * | 7/1991 |
| JP | 10-258756 A | | 9/1998 |
| JP | 10-264837 A | | 10/1998 |
| JP | 2005-096757 A | | 4/2005 |
| JP | 2005-145436 A | | 6/2005 |
| JP | 2006-290043 A | | 10/2006 |
| JP | 2006-312421 A | | 11/2006 |
| JP | 2007-253654 A | | 10/2007 |
| JP | 2008-038900 A | | 2/2008 |
| JP | 2010-132054 A | | 6/2010 |

* cited by examiner (a)

(b)

POWER-STEERING DEVICE

FIELD OF THE INVENTION

The present invention relates to a power steering device for hydraulically assisting a driver's steering force and, more particularly, to a power steering device having a hydraulic control rotary valve driven by a motor to perform an automatic steering function.

BACKGROUND ART

There is conventionally known a power steering device with an automatic steering function as disclosed in e.g. Patent Document 1.

This power steering device is configured as a rack-and-pinion type hydraulic power steering device including an input shaft coupled to a steering wheel, an output shaft relatively rotatably coupled to the input shaft through a torsion bar, a rotary valve arranged at a position between the input shall and the output shaft on the outer circumference of a base end portion of the input shaft and a hollow motor arranged on the outer circumference of a front end portion of the input shaft.

In such a configuration, the rotary valve is opened in response to a driver's steering torque so as to generate a steering assist torque during normal operation mode. During automatic operation mode, by contrast, the rotary valve is opened by the application of a drive torque of the hollow motor under the control of an ECU so as to generate a steering assist torque for automatic steering operation.

PRIOR ART DOCUMENTS

Patent Document

Patent Document 1: Japanese Laid-Open Patent Publication No. 2005-96767.

SUMMARY OF THE INVENTION

Problem to be Solved by the Invention

However, the above conventional power steering device has a problem of poor assembling workability because the hollow motor and the device body are integrated to each other. This results in a deterioration of productivity and a steep rise of manufacturing cost.

In view of the foregoing conventional circumstances, the present invention has been made to provide a power steering device having improved assembling workability.

Means for Solving the Problem

According to the present invention, there is provided a power steering device, comprising: an input shaft rotated in response to a steering operation of a steering wheel; an output shaft coupled to the input shaft through a torsion bar; a power cylinder having a pair of hydraulic pressure chambers defined by a piston to generate a steering assist force based on hydraulic pressures in the hydraulic pressure chambers; a rotary valve that selectively supplies hydraulic fluid from an external hydraulic pressure source to the pair of hydraulic pressure chambers in accordance with relative rotation of the input shaft and the output shaft; a hollow motor arranged to surround at least an axial portion of the input shaft and control rotation of the input shaft based on vehicle driving conditions; and input-shaft-side and rotor-side engagement parts arranged between an outer circumference of the input shaft and an inner circumference of the hollow motor so as to allow relative movement of the input shaft and a rotor of the hollow motor in an axis direction but to restrict relative movement of the input shaft and the rotor of the hollow motor in a rotation direction.

Effects of the Invention

In the present invention, the engagement structure between the input shaft and the rotor of the hollow motor relative rotational movement of the input shaft and the rotor of the hollow motor, but allows relative axial movement of the input shaft and the rotor of the hollow motor. It is therefore possible to mount the hollow motor in the form of a motor assembly to the vehicle body and improve the assembling workability of the power steering device.

BRIEF DESCRIPTION OF DRAWINGS

FIG. 3(*b*) is a section view taken along line A-A of FIG. 3(*a*).

FIG. 9(*b*) is a section view taken along line B-B of FIG. 9(*a*).

FIG. 11(*b*) is a section view taken along line B-B of FIG. 11(*a*).

DESCRIPTION OF EMBODIMENTS

Hereinafter, embodiments of the present invention will be described below in detail with reference to the drawings. By way of example, the following embodiments each refer to an integrated type power steering device suitable for use in a large vehicle.

Figure 1:
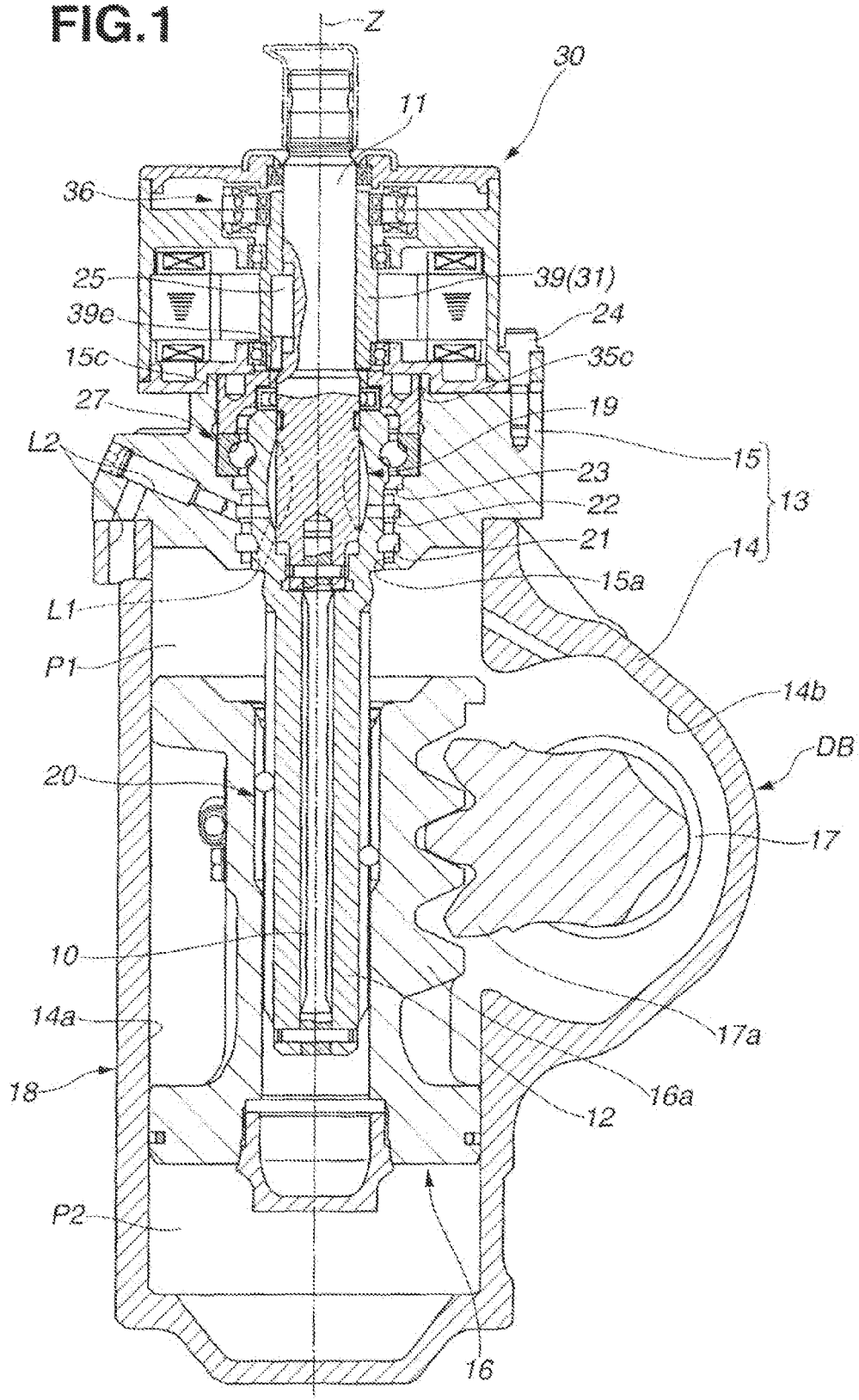
FIG. 1 is a vertical section view of a power steering device according to a first embodiment of the present invention.

FIGS. 1 to 7 show the power steering device according to the first embodiment of the present invention. As shown in FIG. 1, the power steering device includes: a housing 13; an input shaft 11 having one end portion coupled to a steering wheel and the other end portion accommodated in the housing 13; an output shaft 12 totally accommodated in the housing 13 and coupled at one end portion thereof to the other end portion of the input shaft 11 through a torsion bar 10; a substantially cylindrical piston 16 disposed on the outer circumference of the other end portion of the output shaft 12; a sector shaft 17 coupled to steerable vehicle wheels (not shown) so as to steer the steerable vehicle wheels by axial movement of the piston 16; a pair of hydraulic pressure chambers P1 and P2 defined in the housing 13 by the piston 16; a power cylinder 18 for generating an assist torque to assist a steering torque; a rotary valve 19 disposed between the input and output shafts 11 and 12 so as to selectively supply a hydraulic fluid from a hydraulic pressure source (such as a pump; not shown) to the hydraulic pressure chambers P1 or P2 by relative rotation of the input and output shafts 11 and 12; a hollow motor 30 for applying a torque to the input shaft 11 for an automatic steering operation as will be explained later; and a motor ECU 40 having a plurality of control circuits 40a and 40b (see FIG. 5) to perform drive control of the hollow motor 30 based on driving conditions of the vehicle. A main body of the power steering device (simply referred to as "device body DB"), which constitutes a steering system, and a cylindrical rotor 31 of the hollow motor 30 are herein arranged and fitted around the outer circumference of the one end portion of the input shaft 11.

The housing 13 has a cylindrical shape with one end open and the other end closed and includes a first housing member 14 defining therein the hydraulic pressure chambers P1 and P2 and a second housing member 15 attached to close an open end of the first housing member 14 and accommodating therein the rotary valve 19. The housing members 14 and 15 are fixed to each other by a plurality of bolts (not shown) at predetermined circumferential positions.

The first housing member 14 has, formed therein, a cylinder constituting part 14a extending in a direction of a rotation axis Z of the input and output shafts 11 and 12 and a shaft accommodating part 14b extending substantially perpendicular to the cylinder constituting part 14a with a portion of the shaft accommodating pan 14b facing the cylinder constituting part 14a. In the cylinder constituting pan 14a, the piston 16 is relatively movably disposed around the outer circumference of the other end portion of the output shaft 11 via a ball screw mechanism 20. Further, the hydraulic pressure chambers P1 and P2 are defined by the piston 16 in one end side and the other end side of the cylinder accommodating part 14a, respectively. In the shaft accommodating part 14b, the sector shaft 17 is disposed and coupled at one end portion thereof to the piston 16 and at the other end portion thereof to the steerable vehicle wheels via pitman arms.

Teeth 16a and 17a are formed on outer circumferential portions of the piston 16 and the sector shaft 17, respectively, so as to be engageable with each other. By engagement of these teeth 16a and 17a, the sector shaft 17 is rotated with axial movement of the piston 16 so as to pull the pitman arms in a vehicle width direction and thereby change the direction of the steerable vehicle wheels. At this time, the hydraulic fluid is introduced from the first hydraulic pressure room P1 to the shaft accommodating part 14b for lubrication of the teeth 16a and 17a.

A shaft insertion hole 15a is formed in an inner circumferential side of the second housing member 16. A diameter of the shaft insertion hole 15a is stepwise reduced from one end to the other end in the direction of the rotation axis Z. In the shaft insertion hole 15a, the other end portion of the input shaft 11 and the one end portion of the output shaft 12 are arranged to overlap each other with the torsion bar 10 being disposed therebetween. The rotary valve 19 is situated in the overlap region between the input and output shafts 11 and 12.

There are formed, at predetermined axial positions in the diameter-reduced other end portion of the shaft insertion hole 15a, an introduction port 21, a supply/drain port 22 and a discharge port 23. The introduction port 21 is connected to the hydraulic pressure source via an introduction passage so as to externally introduce the hydraulic fluid through a first supply/drain passage L1 of the one end portion (overlap region) of the output shaft 12. The supply/drain port 22 is used to supply or drain the hydraulic fluid to or from the second hydraulic fluid chamber P2 through a radially outwardly extending second supply/drain passage L2. The discharge port 23 are connected to a reservoir tank via a discharge passage so as to discharge the hydraulic fluid from the respective hydraulic pressure chambers P1 and P2.

The rotary valve 19 is kept open to permit communication between the introduction port 21 and the discharge port 23 when the steering wheel is in a neutral position. During steering operation, the rotary valve 19 is opened at one side and closed at the other side according to relative rotation of the input and output shafts 11 and 12.

The above-configured power steering device operates as follows. When the steering wheel is steered, the hydraulic fluid is pressurized and supplied from the hydraulic pressure source to either one of the hydraulic pressure chambers P1 and P2 through the rotary valve 19 depending on the steering direction. Simultaneously, the hydraulic fluid is discharged, by an amount (excess amount) corresponding to the supply amount, from the other of the hydraulic pressure chambers P1 and P2 to the reservoir tank (not shown). As a result, the piston 16 is hydraulically actuated so that the assist torque is applied to the sector shaft 17 based on the hydraulic pressure exerted on the piston 16.

Figure 2:
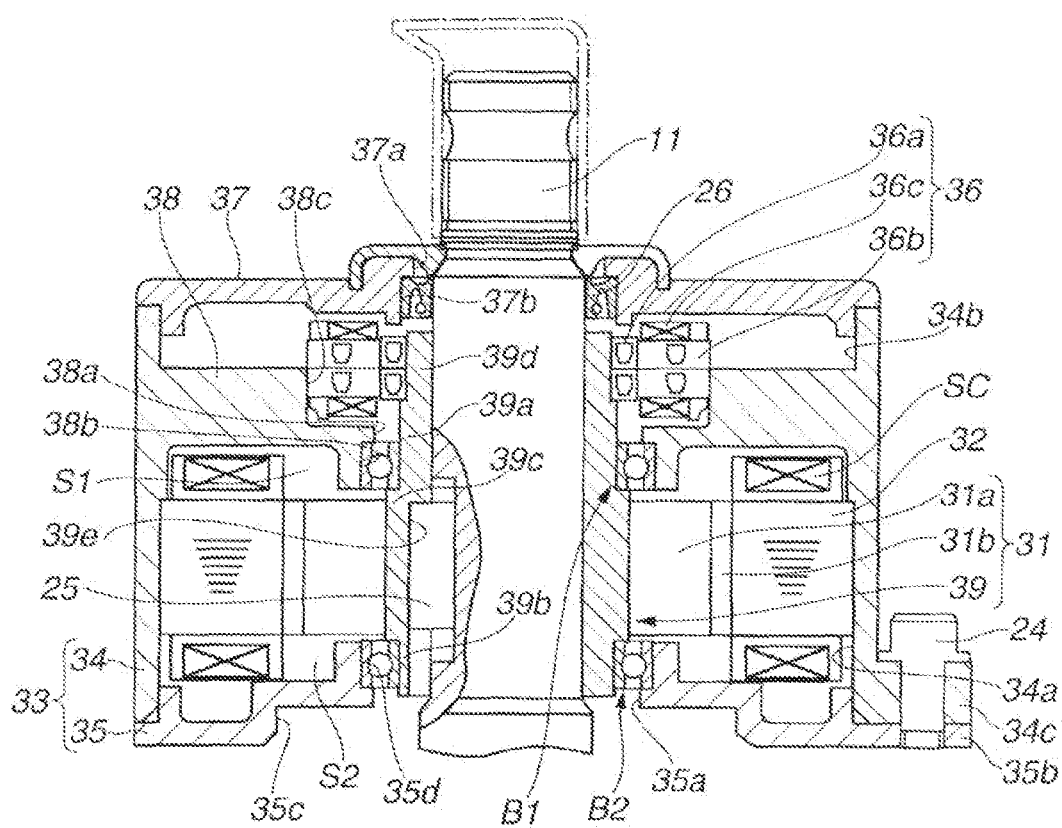
FIG. 2 is an enlarged section view of the vicinity of a hollow motor in the power steering device of FIG. 1.

The hollow motor 30 is in the form of a so-called "three-phase alternating current type brushless motor". As shown in FIGS. 1 and 2, the rotor 31 of the hollow motor 30 is connected by the after-mentioned key connection to the outer circumference of the one end portion of the input shaft 11 exposed outside the housing 13. The hollow motor 30 includes, in addition to the rotor 31, a stator 32 disposed around the outer circumference of the rotor 31 with a slight radial clearance being left therebetween. Herein, the rotor 31 and the stator 32 constitute a motor element. The hollow motor 30 further includes a cylindrical motor housing 33 accommodating therein the motor element and fixed at one end portion thereof to the housing 13, first and second bearings B1 and B2 disposed in the motor housing 33 and rotatably supporting one end portion and the other end portion of the rotor 31, a resolver 36 accommodated in an open cylindrical resolver accommodating part 34b of the other end portion of the motor housing 33 so as to detect a rotational position of the input shaft 11 and a cover member 37 covering an open end (outer end opening) of the resolver accommodating part 34b so as to prevent the entry of moisture and dust particles from the outside.

The motor housing 33 is made of a predetermined metal material such as aluminum alloy and consists of two separate members: a first motor housing member 34 that serves as a housing body accommodating the motor element in one end portion thereof and the resolver 36 in the other end portion thereof; and a second motor housing member 35 that closes one end opening of the first motor housing member 34 and, at the same time, serves as a connector for connection to the housing 13.

The first motor housing member 34 has a motor element accommodating part 34a formed in the one end portion thereof for accommodation of the motor element. On the other hand, the resolver accommodating part 34b is formed on the other end portion of the first motor housing member 34 for accommodation of the resolver 36. These accommodating parts 34a and 34b are separated by a partition wall 38. A shaft insertion hole 38a is formed through the center of the partition wall 38. Radially extending fixing parts 34c are formed at predetermined circumferential positions on the one end portion of the first motor housing member 34. The first motor housing member 34 is fixed to an inner end surface of the second motor housing member 35 by a plurality of bolts 24 through the fixing parts 34c, while both of the input shaft 11 and the other end portion (connection member 39) of the rotor 31 disposed around the input shaft 11 are inserted in the shaft insertion hole 38a.

The motor element accommodating part 34a is stepwisely reduced in diameter toward the partition wall 38. The stator 32 is arranged and accommodated within the motor element accommodating part 34a in abutment with a middle stepped region of the motor element accommodating part 34a. In the first embodiment, the stator 32 is fixed to the motor element accommodating part 34a by predetermined means such as shrinkage fitting. A cylindrical first bearing accommodating pan 38b is formed on an edge of the shaft insertion hole 38a in one surface (wall surface) of the partition wall 38 facing the motor element accommodating part 34a for accommodation of the first bearing B1.

A resolver receiving part 38c is formed in the other wall surface of the partition wall 38 by enlargement of an edge of the shaft insertion hole 38a. The resolver accommodating part 34b is made integral with the resolver receiving part 38c. The whole of the resolver 36 is arranged and accommodated within the resolver accommodating part 34b with a resolver stator 36b being axially partially fitted in the resolver receiving part 38c and a resolver rotor 36a being disposed radially inside the resolver rotor 36b and fitted around the rotor 31 (connection member 39).

The second motor housing member 35 has a substantially plate shape with some projections and depressions. A shaft insertion hole 35a is formed through the center of the second motor housing member 35. Both of the input shaft 11 and the other end part (connection member 39) of the rotor 31 disposed around the input shaft 11 are inserted in the shaft insertion hole 35a. Protruding fixing parts 35b are formed at predetermined circumferential positions on the outer circumference of the second motor housing member 35. The second motor housing member 35 is fixed together with the first motor housing member 34 by the bolts 24 through the fixing parts 35b.

A protruding portion 15c is formed on an outer end surface of the second housing member 15, whereas a recessed portion 35c is formed in the center of an outer end surface of the second motor housing member 35. The hollow motor 30 and the rotary valve 19 can be placed in position relative to each other by engagement of the protruding portion 15c and the recessed portion 35c. A cylindrical second bearing accommodating part 35d is formed on an edge of the shaft insertion hole 35a in an inner surface of the recessed portion 35c for accommodation of the second bearing B2.

The rotor 31 includes a cylindrical connection member 39 fitted around and connected to the outer circumference of the one end portion of the input shaft 11 exposed outside from the housing 13 so that the connection member 39 can rotate together with the input shaft 11. The rotor 31 also includes a rotor core 31a made of a magnetic material and disposed around the outer circumference of the connection member 39 and a plurality of magnets 31b joined to the outer circumference of the rotor core 31a. Alternatively, the rotor 31 may be configured as an IPM motor in which the plurality of magnets 31b are embedded in the rotor core 31a.

First and second small-diameter regions 39a and 39b of relatively small diameter are formed on both end portions of the connection member 39 and rotatably supported on the respective first and second bearings B1 and B2. A large-diameter region 39c is formed on a portion of the connection member 39 between the small-diameter regions 39a and 39b. The rotor core 31a is press-fitted to an outer circumferential surface of the large-diameter region 39c.

A region in front of the first small-diameter region 39a is further stepwisely reduced in diameter and thereby adapted as a third small-diameter region 39d. In the first embodiment, the resolver rotor 36a is mounted to the third small-diameter region 39d. Namely, the third small-diameter region 39 for mounting of the resolver rotor 36a is set smaller in diameter than the first small-diameter region 39a for mounting of the first bearing B1. The resolver rotor 36a is thus made smaller in outer diameter even in a state that the resolver rotor 36a is fitted around the connection member 39 (third small-diameter region 39d). The resolver stator 36b, arranged around the resolver rotor 36a, is accordingly made smaller in diameter. This leads to a downsizing of the entire resolver 36.

Figure 3:
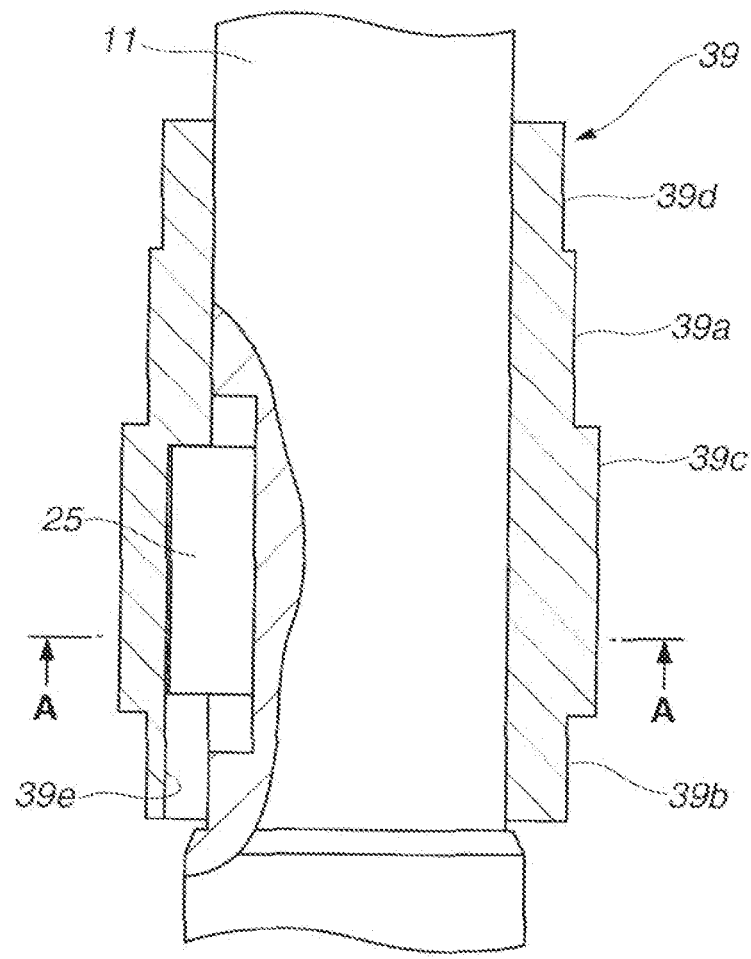
FIG. 3(*a*) is an enlarged section view of the vicinity of engagement between an input shaft and a rotor of the hollow motor in the power steering device of FIG. 1.
Figure 3:
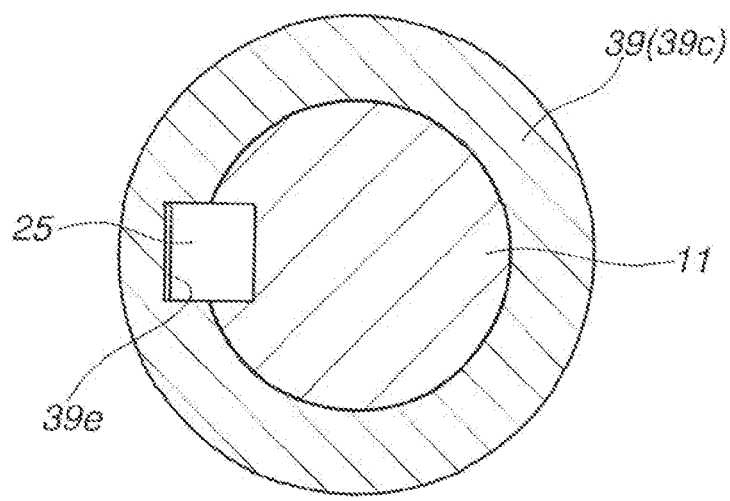

As shown in FIGS. 2 and 3, the connection member 39 is attached around the outer circumference of the input shaft 11 by the so-called key connection. The key connection is provided with an input-shaft-side engagement part and a rotor-side engagement part. The input-shaft-side engagement part is formed by axially cutting a recessed groove 11a in an outer circumferential surface of the input shaft 11 and press-fitting a metal piece as a key 25 in the axial groove 11a. The rotor-side engagement part is formed by axially cutting a key groove 39e in an inner circumferential surface of the connection member 39 such that the key groove 39 extends from an opening end of the connection member 39 and overlaps in position with the entire large-diameter region 39c. The key connection is established by engagement of these engagement parts.

In the first embodiment, the key connection is not designed to fix the input shaft 11 and the rotor 31 in position by press-fitting the key 25 in the key groove 39e as in conventional key connections. The dimensional relationship of the key 25 and the key groove 39e is set such that the rotor 31 is detachable relative to the key 25 (input shaft 11) in the first embodiment. More specifically, the dimensional relationship of the key 25 and the key groove 39e is set so as to eliminate unnecessary play between the key 25 and the key groove 39e and, after disengagement of the key 25 and the key groove 39e, easily re-engage the key 25 and the key groove 39e with each other.

As shown in FIG. 2, the stator 32 includes a plurality of stator cores 32a stacked into a circular shape and press- or shrinkage-fitted in the motor element accommodating part 34a, teeth (not shown) formed protrudingly on respective inner circumferential portions of the stator cores 32a and stator coils SC (SC1, SC2) of three phases (U phase, V phase and W phase) wound to the teeth.

The stator coils SC are provided as separate first and second stator coils SC1 and SC2. These coils SC1 and SC2 are connected to the separate control circuits 40a and 40b but are wound to the same teeth. There is thus provided a multiplex control circuit system with the control circuits 40a and 40b for one motor 30 so that, even when there occurs a failure in one of the control circuits 40a and 40b, the hollow motor 30 can be driven and controlled by the other of the control circuits 40a and 40b (see FIG. 5).

In the resolver 36, the resolver rotor 36a is equipped with a plurality of salient poles corresponding in number to counter poles of the rotor 31 and disposed around the outer circumference of the other end portion of the connection member 39. A diameter RO of the resolver rotor 36a is set smaller than inner diameters of the shaft insertion holes 38a and 35a of the first and second motor housing members 34 and 35 (see FIG. 6). The resolver stator 36b is retained in the resolver accommodating part 34b, with a slight radial clearance being left on an outer circumferential side of the resolver rotor 36a, and thereby kept from contact with the resolver rotor 36a. Sensor coils 36c and 36d are wound to the resolver stator 36b and connected to the separate control circuits 40a and 40b.

Each of the first and second bearings B1 and B2 is in the form of a ball bearing. In the first embodiment, at least one of the first and second bearings B1 and B2 is configured to restrict axial movement of the rotor 31 for stable driving of the hollow motor 30.

The cover member 37 is substantially plate-shaped. A shaft insertion hole 37a is formed through the center of the cover member 37. The other end portion of the input shaft 11 is inserted in the shaft insertion hole 37a. A seal accommodating part 37b is formed in a recessed manner around an edge of the shaft insertion hole 37a on an inner surface of the cover member 37. A seal member 26 is fitted in the seal accommodating part 37b so as to establish a fluid-tight seal between the input shaft 11 and the cover member 37 and prevent the entry of moisture and dust particles from the outside through the shaft insertion hole 37a.

Figure 4:
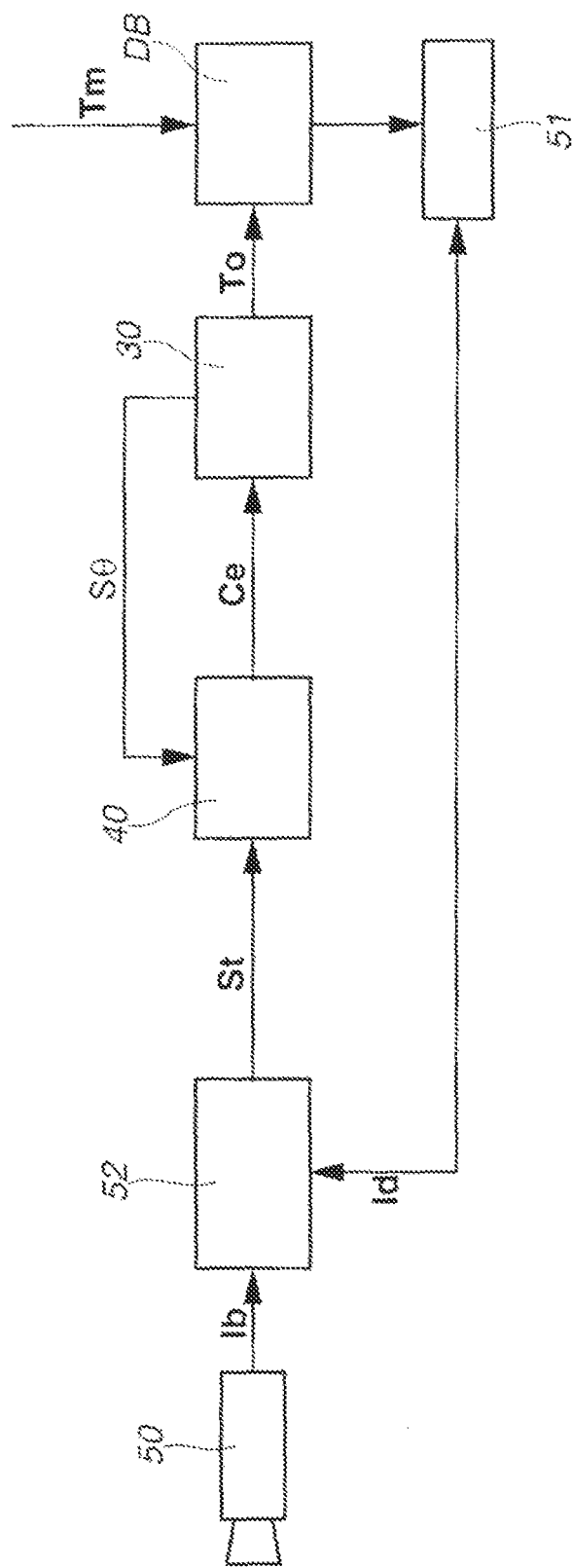
FIG. 4 is a system configuration diagram of the power steering device of FIG. 1.

As shown in FIG. 4, there are provided various support information identification means 50, such as camera that recognizes another vehicle travelling ahead or white lines on a travelling lane, car navigation system or the like, to give driving support information Ib other than the driver's steering torque Tm. There are also provided a vehicle-mounted main ECU 51 to give vehicle driving information Id based on the detection signals of various sensors such as vehicle speed sensor, steering angle sensor and yaw rate sensor and an automatic operation ECU 52 to generate a torque commend signal St on the basis of the driving support information Ib and the vehicle driving information Id. On the other hand, the resolver 36 generates and outputs a rotation angle signal Sθ. Based on these signals St and Sθ, the motor ECU 40 performs drive control of the hollow motor 30 with the application of a control current Ce.

Figure 5:
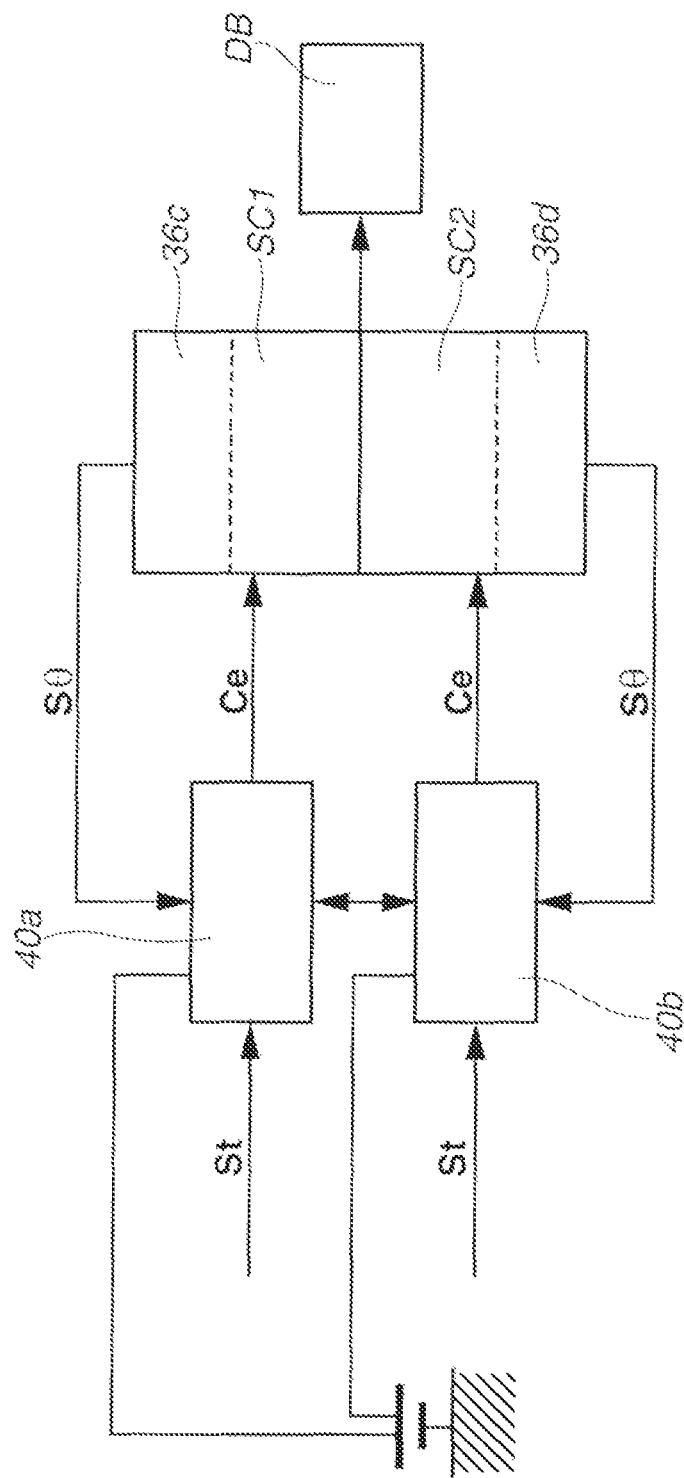
FIG. 5 is a system configuration diagram of the hollow motor of FIG. 2.

More specifically, the motor ECU 40 has a plurality of control circuits (two control circuits in the first embodiment), i.e., first and second control circuits 40a and 40b as shown in FIG. 5. Each of the first and second control circuits 40a and 40b receives the torque commend signal St from the automatic operation ECU 52 and the rotation angle signal Sθ from the resolver 36 and calculates the control current Ce based on these signals St and Sθ. Then, the first and second control circuits 40a and 40b apply the control current Ce to the stator coils SC1 and SC2, respectively.

In the above configuration, the power steering device enables not only manual steering operation in response to the driver's steering torque Tm but also, for example, in the case where the vehicle is about to deviate from the traveling lane due to dozing driving, automatic steering operation to apply the steering torque To, rotate the input shaft 11 and thereby let the vehicle keep travelling in the travelling lane by drive control of the hollow motor 30 based on the driving support information Ib from the support information identification means 50) and the vehicle driving information Id from the sensors as shown in FIGS. 1 and 4.

Herein, the energization and drive control of the hollow motor 30 is performed during steering as well as during straight driving. Namely, the hollow motor 30 is driven and controlled in both of the case where the steering torque is generated for left or right steering and the case where the rotation of the input shaft 11 is restricted by generation of a steering retaining torque.

Figure 6:
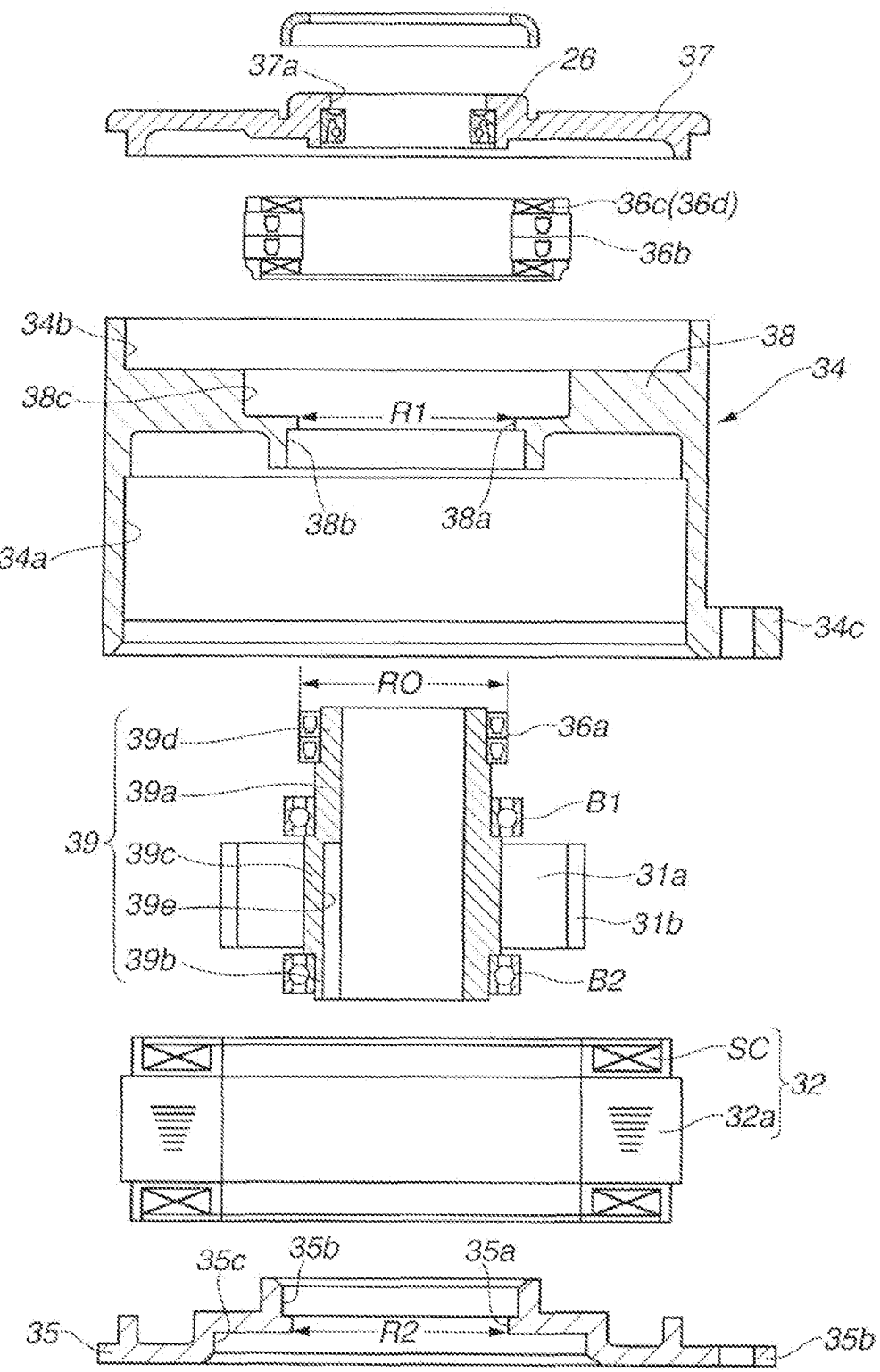
FIG. 6 is an exploded section view showing how to assembling the hollow motor of FIG. 2.

Next, the assembling process of the power steering device of the first embodiment will be explained below with reference to FIGS. 6 and 7.

The device body DB of the power steering device is assembled as follows. The input shaft 11 and the output shaft 12 are coupled to each other through the torsion bar and thereby combined as a shaft assembly. The piston 16 is coupled to one end portion of the shaft assembly. The other end portion of the shaft assembly is inserted and mounted in the second housing member 15 via a bearing 27. The one end portion of the input shaft 11 to which the piston 16 is coupled is arranged in the first housing member 14. Then, the second housing member 15 is fitted and fixed into the first housing member 14. Simultaneously with the arrangement of the input shaft 11 and the piston 16, the sector shaft 17 is also arranged in the first housing member 14 so as to bring the teeth 16a and 17a into engagement with each other.

Separately from the assembling of the device body DB, the hollow motor 30 is assembled as follows. The stator cores 32a to which the stator coil SC is wound is fitted to an inner circumferential surface of the first motor housing member 34. As to the rotor 31, the rotor core 31a is fitted to the outer circumferential surface of the large-diameter region 39c of the connection member 39. The first bearing B1 and the recover rotor 36a are then fitted around outer circumferential surfaces of the first and third small-diameter regions 39a and 39d of the connection member 39, respectively. The second bearing B1 is also fitted around an outer circumferential surface of the second small-diameter region 39b of the connection member 39. After that, the rotor 31 is inserted from the side of the first small-diameter region 39a in an inner circumferential side of the stator 32, which has been arranged in the first motor housing member 34, and mounted in the first motor housing member 34 via the first hearing B1.

In the first embodiment, the outer diameter RO of the resolver rotor 36a is set relatively small relative to the inner diameters R1 and R2 of the shaft insertion holes 38a and 35a of the first and second motor housing members 34 and 35. the rotor 31 can be thus arranged and accommodated in the motor housing 33 in the state of the resolver rotor 36a being mounted to the rotor 31 (connection member 39). It is thus possible in the first embodiment to improve the assembling workability of the power steering device as compared to the case of mounting the resolver rotor 36a to the rotor after arranging and accommodating the rotor 31 in the motor housing 33.

Subsequent to the accommodation and arrangement of the motor element, the one end of the first motor housing member 34 is closed by the second motor housing member 35. The resolver stator 36b is inserted in the first motor housing member 34 and disposed in the resolver receiving part 38. Then, the other end of the first motor housing member 34 is closed by the cover member 37. With this, the assembling of the hollow motor 30 is completed. After the completion of such motor assembling, the hollow motor 30 is driven for its operational test.

Figure 7:
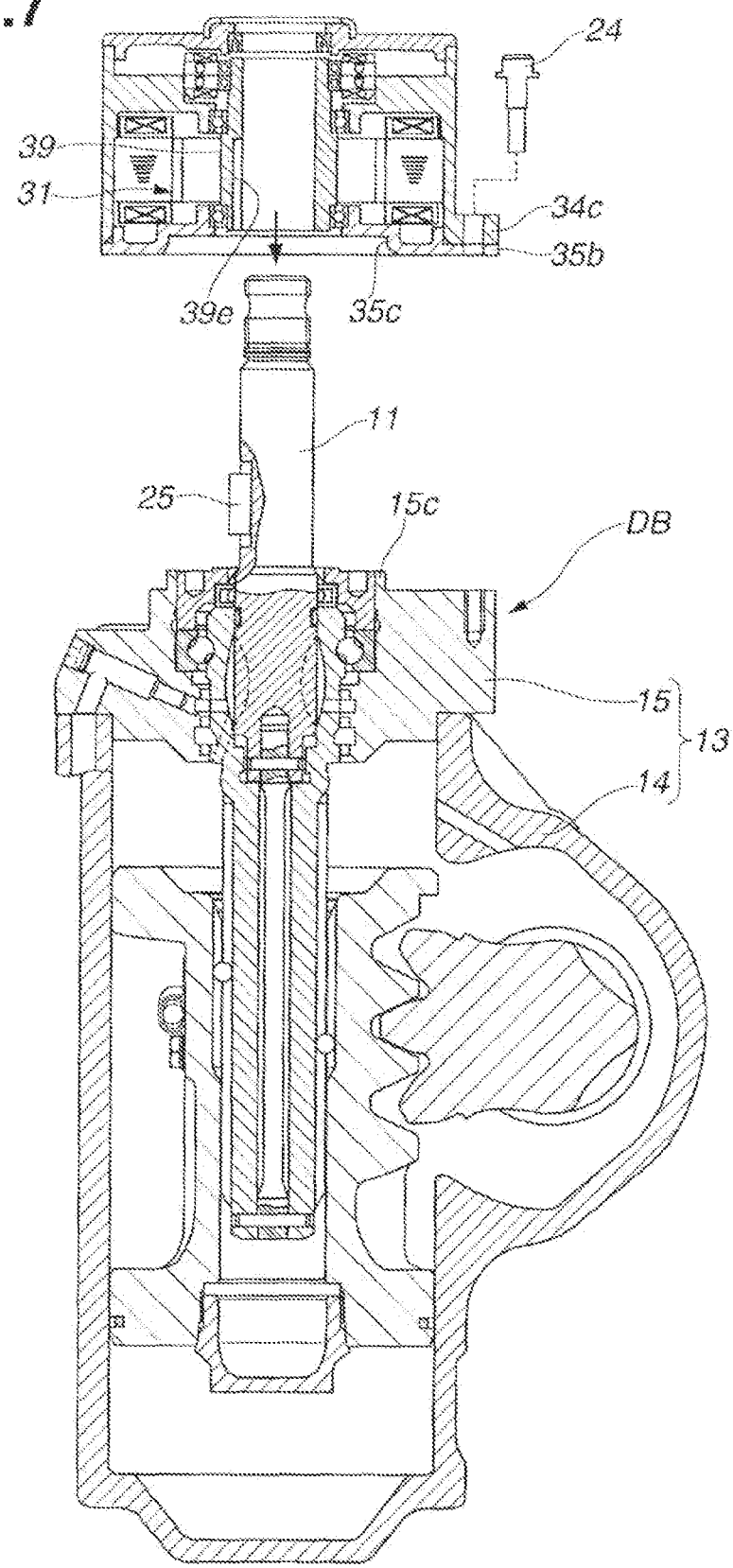
FIG. 7 is an exploded section view showing how to assembling the power steering device of FIG. 1.

Finally, the power steering device is completed by fixing the key 25 to the input shaft 11 and, after the operational test of the hollow motor 30, fitting the rotor 31 of the hollow motor 30 around the end portion of the input shaft 11 and thereby mounting the assembly of the hollow motor 30 to the housing 13 (second housing member 15) as shown in FIG. 7. More specifically, the hollow motor 30 is fitted around the outer circumference of the input shaft 11 by, while inserting the end portion of the input shaft 11 in the inner circumference of the connection member 39, engaging the key 25 of the outer circumference of the input shaft 11 in the key groove 39e of the inner circumference of the rotor 31 (connection member 39). After the protruding portion 15c of the second housing member 15 is engaged in the recessed portion 35c of the second motor housing member 35, the hollow motor 31 is fixed to the second housing member 15 by insertion of the bolts 24 through the fixing parts 34c and 35b.

In the first embodiment, the key groove 39e in which the key 25 is engaged is formed on a region from the open end of the connection member 39 to an axial position required for power transmission to the rotor 31. The remaining regions of the input shaft 11 and the connection member 39 are fitted to each other with a minimal radial clearance being left therebetween so that, even when there occurs rattling between the engagement parts of the input shaft 11 and the connection member 39, such rattling can be restricted by the remaining fitting regions.

As described above, the power steering device of the first embodiment is characterized in that the key 25 and the key groove 39e are provided on the input shaft 11 and the inner circumferential surface of the rotor 31 (connection member 39), respectively, so as to constitute the engagement structure for connection between the input shaft 11 and the rotor 31. This key engagement structure restricts relative movement of the input shaft 11 and the rotor 31 in the rotation direction, but allows relative movement of the input shaft 11 and the rotor 31 in the axis direction. It is therefore possible in the first embodiment to mount the hollow motor 30 in the form of the motor assembly to the device body DB and improve the assembling workability of the power steering device.

In the assembly of the hollow motor 30, the both end portions of the rotor (connection member 39) are rotatably supported in the motor housing 33 by the first and second bearings B1 and B2. As the operational test can be performed on the motor 30 by itself, it is possible to increase the degree of flexibility in the assembling process of the power steering device. In other words, it is feasible to assemble the hollow motor 30 separately from the device body DB or feasible to purchase and use the hollow motor 30 as the operational test can be performed on the hollow motor 30 by itself. This contributes to a reduction of device manufacturing cost.

Further, the stator coil SC protrudes axially outwardly from the both ends of the rotor 31 so that there are dead space areas S1 and S2 formed on an inner circumferential side of the stator coil SC. To support the both end portions of the rotor 31 by the first and second bearings B1 and B2, these bearings B1 and B2 can be arranged in the respective dead space areas S1 and S2. This makes it possible to make effective use of the space inside the hollow motor 30 and prevent an upsizing of the hollow motor 30 and, by extension, an upsizing of the power steering device.

In the first embodiment, the first bearing B1 can be arranged in the dead space area S1 as the resolver 36 is located axially outside the first bearing B1 in the hollow motor 30. This leads to a downsizing of the power steering device by optimization of component layout.

Furthermore, the resolver 36 is located on the side of the hollow motor 30 axially opposite from the rotary valve 19 in the first embodiment. This makes it possible to avoid interference between the resolver 36 and the second motor housing member 35 (recessed portion 35c) so that the power steering device can achieve good component layout.

In the assembly of the hollow motor 30, the side of the hollow motor 30 facing the rotary valve 19 (i.e. the side of the hollow motor 30 fixed to the device body DB) is also closed by the second motor housing member 35. Thus, the motor 30 by itself can ensure predetermined dust resistance.

Figure 8:
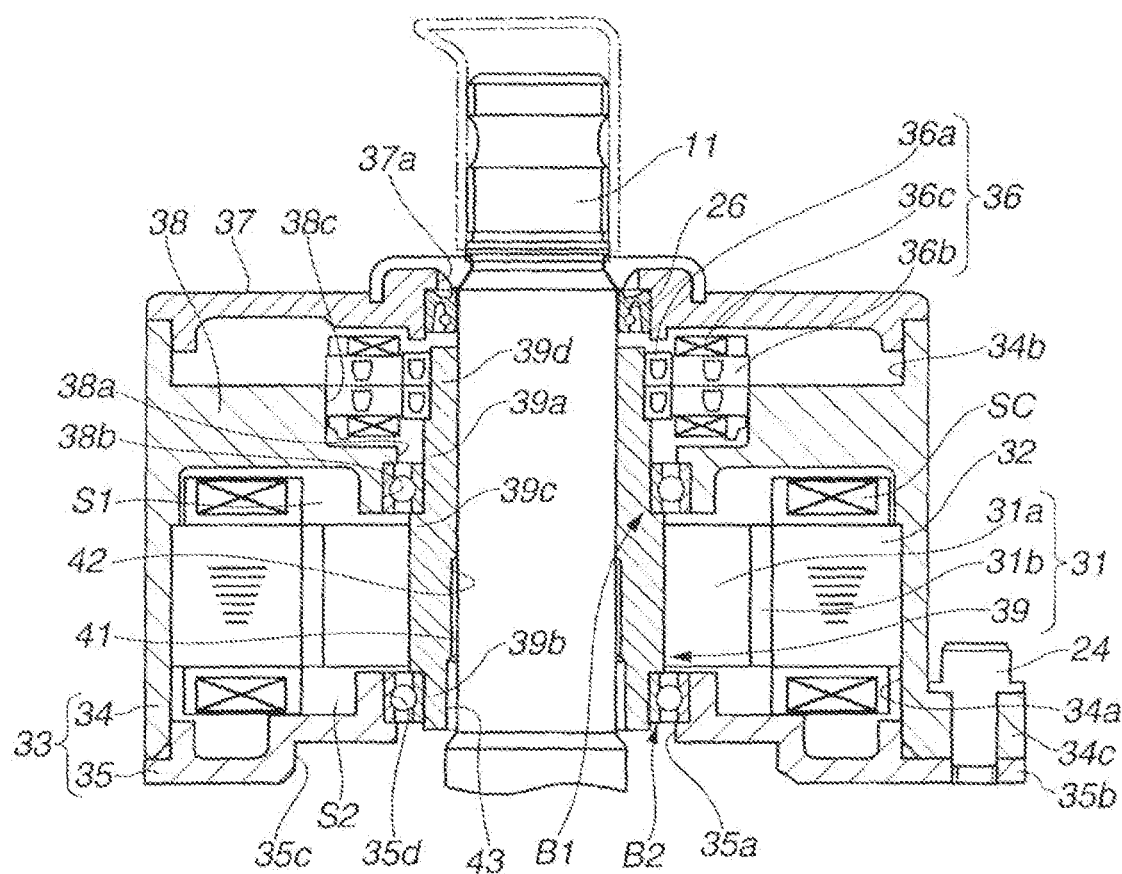
FIG. 8 is an enlarged section view corresponding to FIG. 2 but showing a hollow motor in a power steering device according to a second embodiment of the present invention.
Figure 9A:
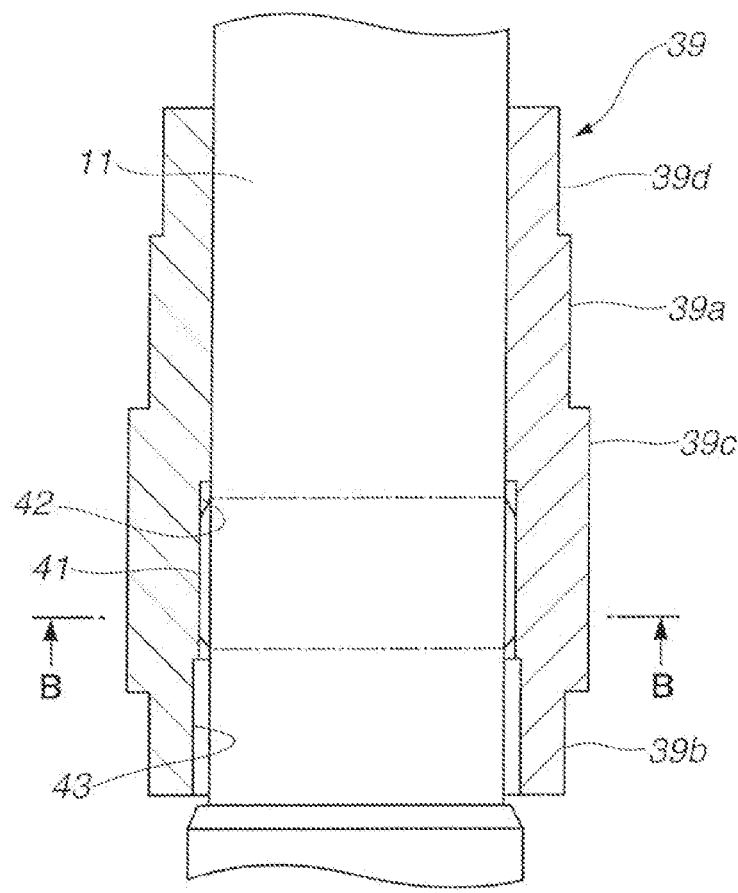
FIG. 9(*a*) is an enlarged section view of the vicinity of engagement between an input shaft and a rotor of the hollow motor in the power steering device of FIG. 8.
Figure 9B:
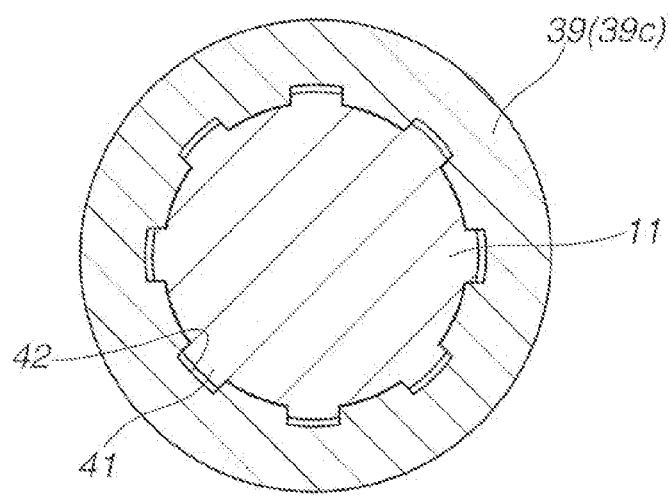

FIGS. 8 and 9 show the power steering device according to the second embodiment of the present invention. The second embodiment is different from the first embodiment in the engagement structure between the input shaft 11 and the rotor 31 (connection member 39). Hereinafter, an explanation will be given only of the difference of the second embodiment from the first embodiment. In the second embodiment, the same reference numerals are assigned to parts and portions identical to those in the first embodiment; and detailed explanations of those parts and portions are omitted herefrom.

In the second embodiment, a male serration 41 is formed on a predetermined region of the outer circumference of the other end portion of the input shaft 11 (corresponding in position to the large-diameter region 39c of the connection member 39); whereas a female serration 42 is formed on the inner circumference of the connection member 39 of the rotor 31 so as to face the male serration 41. The input shaft 11 and the rotor 31 are connected to each other by engagement of these serrations 41 and 42.

A region of the inner circumference of the connection member 39 overlapping in position with the second small-diameter region 39b is adapted as a flat region 43 having a predetermined inner diameter that does not interfere with the male serration 41. Namely, the female serration 42 is formed only on a predetermined axial region required for torque transmission. It is thus possible to minimize the engagement area and attain ease of assembling by engagement (engagement operation) and improvement of device productivity as compared to the case of forming the female serration 42 throughout the region of insertion of the male serration 41 on the inner circumference of the connection member 39.

In the second embodiment, the serration connection is not designed as firm engagement such as press-fitting, but is designed to allow relatively easy movement between the input shaft 11 and the connection member 39 and thereby permit re-engagement during mounting of the motor to the device body DB so that, even when there occurs a problem after the mounting of the hollow motor 30 to the device body DB, the hollow motor 30 and the device body DB can be disassembled and assembled again for improvement of manufacturing yield.

In such engagement structure, the clearance between the serrations 41 and 42 is filled with a predetermined resin material so as to prevent rattling between the serrations 41 and 42 after the assembling and attain good torque transmission while securing improvement of manufacturing yield.

As described above, the power steering device of the second embodiment is characterized in that the input shaft 11 and the rotor 31 are connected to each other by the serration connection. This serration engagement structure also restricts relative movement of the input shaft 11 and the rotor 31 in the rotation direction, but allows relative movement of the input shaft 11 and the rotor 31 in the axis direction. It is therefore possible in the second embodiment to obtain the same effects as in the first embodiment.

In particular, the serration connection of the second embodiment leads to an increase of contact area in the rotation direction so as to attain better torque transmission as compared to the key connection of the first embodiment.

Figure 10:
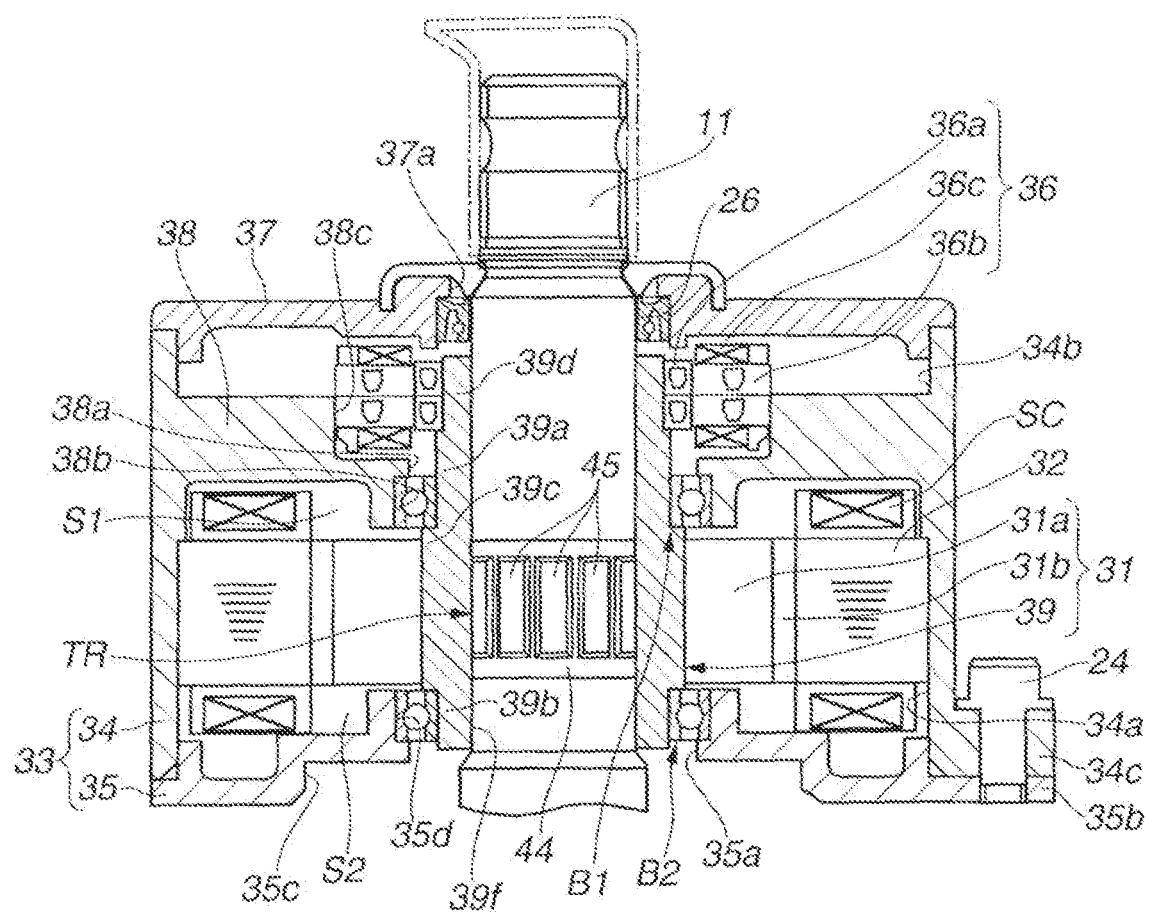
FIG. 10 is an enlarged section view corresponding to FIG. 2 but showing a hollow motor in a power steering device according to a third embodiment of the present invention.
Figure 11A:
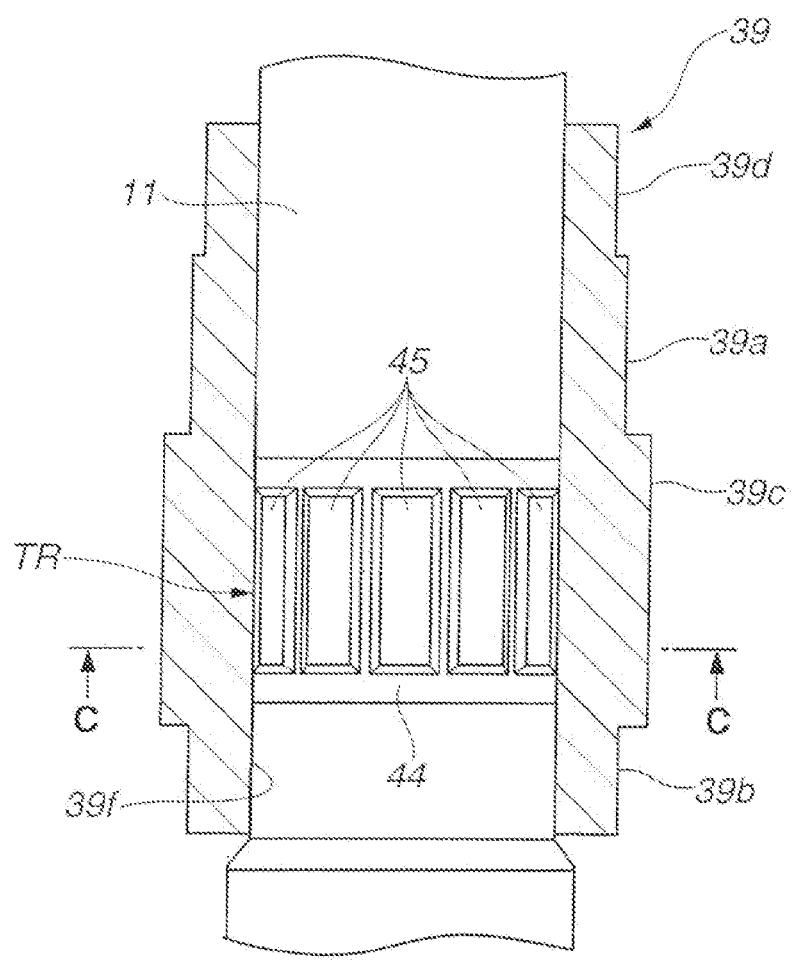
FIG. 11(*a*) is an enlarged section view of the vicinity of engagement between an input shaft and a rotor of the follow motor in the power steering device of FIG. 10.
Figure 11B:
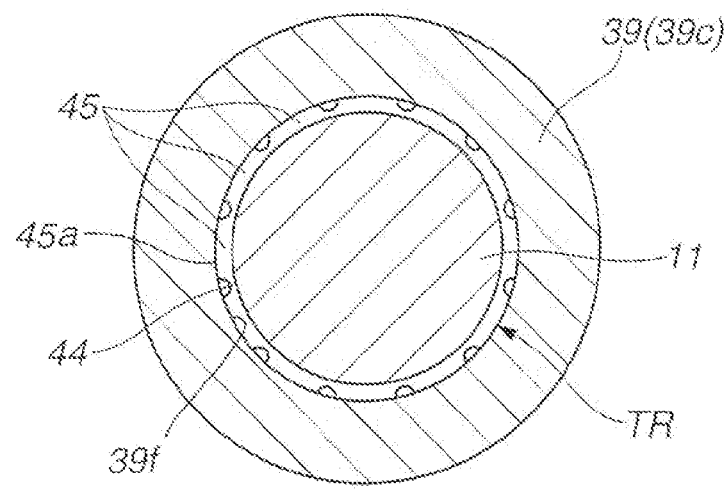

FIGS. 10 and 11 show the power steering device according to the third embodiment of the present invention. The third embodiment is different from the first embodiment in the engagement structure between the input shaft 11 and the rotor 31 (connection member 39). Hereinafter, an explanation will be given only of the difference of the third embodiment from the first embodiment. In the third embodiment, the same reference numerals are assigned to parts and portions identical to those in the first embodiment; and detailed explanations of those parts and portions are omitted herefrom.

In the third embodiment, a tolerance ring TR of known type is fitted around a predetermined region of the outer circumference of the other end portion of the input shaft 11 (corresponding in position to the large-diameter region 39c of the connection member 39). This tolerance ring TR has an annular base portion 44 and a plurality of projection portions 45 arranged on an outer circumferential surface of the base portion 44 and constitutes a torque limiter between the input shaft 11 and the rotor 31 (connection member 39).

More specifically, an inner circumferential surface of the base portion 44 is fitted on the outer circumferential surface of the input shaft 11; and respective tip end surfaces 45a of the projection portions 45 are pressed against the inner circumferential surface 39f of the connection member 39 with a predetermined pressure. By a frictional force between these surfaces 39f and 45a the input shall 11 and the rotor 33 are connected to rotate together with each other.

As described above, the power steering device of the third embodiment is characterized in that the torque limiter is constituted by the tolerance ring TR to establish engagement between the input shaft 11 and the rotor 31. This engagement structure also restricts relative movement of the input shaft 11 and the rotor 31 in the rotation direction, but allows relative movement of the input shaft 11 and the rotor 31 in the axis direction. It is therefore possible in the third embodiment to obtain the same effects as in the first embodiment.

In particular, the engagement structure of the third embodiment makes it possible that, when an excessive torque is inputted from the hollow motor 30 to the input shaft 11, the torque limiter can relieve such an excessive torque by slippage between the input shaft 11 (TR) and the connection member 39 so as to prevent the occurrence of breakage in the engagement parts of the input shaft 11 (TR) and the connection member 39.

Furthermore, the use of the tolerance ring TR makes it possible that the inner circumferential surface of the connection member 39 can be processed into a flat shape with relatively rough precision for reduction of processing cost and makes it possible to compensate for dimensional changes caused by difference in thermal expansion rate between the input shaft 11 and the connection member 39.

The present invention is not limited to the above-described embodiments. Although the present invention is embodied as the integral type power steering device in the above embodiments, it is feasible to apply the present invention to any other type of power steering device, such as a rack-and-pinion type power steering device for an ordinary vehicle, as long as the subject matter of the present invention, such as power cylinder 18 and rotary valve 19 (control valve) is included.

In addition, the configuration of the present invention has a merit that, even in the case where the hydraulic fluid is not supplied to the device body DB due to a failure in the pump as the external hydraulic pressure source or in the piping etc. between the pump and the device body DB, steering assist can be performed by drive control of the hollow motor 30. It is thus possible to achieve further improvement in vehicle safety.

Hereinafter, an explanation will be given of technical ideas comprehended from the above embodiments but not described in the following claims.

(a) The power steering device according to claim 5, wherein a region of the rotor in which the resolver rotor is disposed is set smaller in outer diameter than a region of the rotor in which the first bearing is disposed.

By setting the outer diameter of the rotor to a small value as mentioned above, not only the resolver rotor around the rotor but also the resolver stator around the resolver rotor can be made smaller in out diameter. This leads to a downsizing of the entire resolver.

(b) The power steering device according to claim 2, wherein at least one of the first and second bearings is in the form of a ball hearing adapted to restrict movement of the rotor in the axis direction.

In such a case, the rotor can be effectively restricted from moving in the axis direction.

(c) The power steering device according to claim 1, wherein the rotor of the hollow motor is substantially cylindrical in shape; wherein the hollow motor includes: a stator arranged around an outer circumference of the rotor; and a motor housing accommodating therein the rotor and the stator; and wherein the motor housing includes: a cylindrical member arranged radially outside the stator; and an axial end closing member closing a rotary-valve-side end of the cylindrical member.

The motor by itself can ensure predetermined dust resistance by also closing the rotary-valve-side of the motor housing as mentioned above.

(d) The power steering device according to claim 1, wherein the rotor of the hollow motor is substantially cylindrical in shape; wherein the hollow motor is in the form of a brushless motor having: a stator arranged around an outer circumference of the rotor; a motor housing accommodating therein the rotor and the stator; and a resolver arranged on an side of the rotor opposite from the rotary valve in the axis direction so as to detect a rotational position of the rotor; wherein the motor housing has a recessed engagement portion formed in a rotary-valve-side surface thereof in the axis direction so as to surround the input shaft; wherein the power steering device further comprises a valve housing part accommodating therein the rotary valve; and wherein the valve housing part has, formed on a motor-housing-side surface thereof, a protruding engagement portion engageable in the recessed engagement portion.

The hollow motor and the rotary valve can be placed in position relative to each other by engagement of the recessed engagement portion and the protruding engagement portion. This leads to improvement in the assembling workability of the power steering device.

In addition, the resolver is located on the side of the hollow motor axially opposite from the rotary valve so as to avoid interference between the recessed engagement portion and the resolver. This contributes to an axial dimension reduction of the power steering device.

(e) The power steering device according to claim 1, wherein the input-shaft-side engagement part and the rotor-side engagement part are provided on only a rotary-valve-side region of the rotor in the axis direction.

In such a case, the assembling of these engagement parts can be facilitated as compared to the case where the engagement parts are provided on the entire axial region of the rotor.

(f) The power steering device according to claim 1, wherein the input-shaft-side engagement part and the rotor-side engagement part are formed with respective serrations and engaged with each other by the serrations.

This engagement permits torque transmission between the hollow motor and the input shaft while allowing relative axial movement of the hollow motor and the input shaft.

(g) The power steering device according to (f), wherein there is a resin material filled in between the input-shaft-side engagement part and the rotor-side engagement part.

By filling the resin material as mentioned above, the input shaft and the rotor can be prevented from rattling so as to attain good torque transmission.

(h) The power steering device according to claim 1, wherein the input-shaft-side engagement part and the rotor-side engagement part are provided on a predetermined region of the rotor in the axis direction; and wherein remaining regions of the input shaft and the rotor are formed with flat circumferential surfaces and adapted to allow contact between the flat circumferential surfaces along entire circumferences thereof.

This makes it possible that, even when there occurs rattling between the engagement parts, such rattling can be restricted by the remaining regions.

(i) The power steering device according to claim 1, wherein there is provided a torque limiter between the input-shaft-side engagement part and the rotor-side engagement part.

By the adoption of the torque limiter, both of the engagement parts can be protected from breakage even during input of an excessive torque.

(j) The power steering device according to claim 1, wherein the rotor of the hollow motor is substantially cylindrical in shape; wherein the hollow motor includes a plurality of stator elements having respective coils wound around the outer circumference of the rotor; and wherein the power steering device further comprises different energization circuits to which the coils of the stator elements are connected, respectively.

In this case, the multiplex control circuit system can be constituted without the use of a plurality of motors.

(k) The power steering device according to claim 7, wherein the rotor of the hollow motor is substantially cylindrical in shape; and wherein the hollow motor includes: a stator arranged around an outer circumference of the rotor; a motor housing accommodating therein the rotor and the stator; and first and second bearings disposed in the motor housing and supporting the rotor.

The motor by itself can be subjected to operational test such as calibration. This leads to a higher degree of flexibility in the assembling process of the power steering device.

(l) The power steering device according to (k), wherein the rotor has: a large-diameter region formed at a middle thereof in the rotation axis direction of the input shaft and facing the stator; and first and second small-diameter regions formed on one side and the other side of the large-diameter region in the axis direction and made smaller in diameter than the large-diameter region; wherein the stator extends to the one side and the other side of the large-diameter region in the axis direction; wherein the first bearing is disposed between the first small-diameter region and the stator; and wherein the second bearing is disposed between the second small-diameter region and the stator.

In this case, both of the bearings can be arranged in so-called dead spaces between the small-diameter regions of the rotor and the stator so as to prevent an upsizing of the power steering device.

(m) The power steering device according to (l), wherein the hollow motor is in the form of a brushless motor having a resolver to detect a rotational position of the rotor; and wherein the resolver is located outside the first bearing in the axis direction.

As the resolver is located axially outside the first bearing, the first bearing can be arranged in the dead space so as to allow optimization of component layout for downsizing of the power steering device.

DESCRIPTION OF REFERENCE NUMERALS

10: Torsion bar
11: Input shaft
12: Output shaft
16: Piston
18: Power cylinder
19: Rotary valve (Control valve)
25: Key (Input-shaft-side engagement part)
30: Hollow motor
39*e*: Key groove (Rotor-side engagement part)
39*f*: Inner circumferential surface (Rotor-side engagement part)
41: Male serration (Input-shaft-side engagement part)
42: Female serration (Rotor-side engagement pan)
45*a*: Tip end surface of projection portion (Input-shaft-side engagement part)
P: First hydraulic pressure room (Pair of hydraulic pressure chambers)
P2: Second hydraulic pressure room (Pair of hydraulic pressure chambers)

The invention claimed is:
1. A power steering device, comprising:
an input shaft rotated in response to a steering operation of a steering wheel;
an output shaft coupled to the input shaft through a torsion bar;
a power cylinder having a pair of hydraulic pressure chambers defined by a piston to generate a steering assist force based on hydraulic pressures in the hydraulic pressure chambers;
a rotary valve that selectively supplies hydraulic fluid from an external hydraulic pressure source to the pair of hydraulic pressure chambers in accordance with relative rotation of the input shaft and the output shaft;
a hollow motor arranged to surround at least an axial portion of the input shaft and control rotation of the input shaft based on vehicle driving conditions; and
input-shaft-side and rotor-side engagement parts arranged between an outer circumference of the input shaft and an inner circumference of the hollow motor so as to allow relative movement of the input shaft and a rotor of the hollow motor in an axis direction but to restrict relative movement of the input shaft and the rotor of the hollow motor in a rotation direction.

2. The power steering device according to claim 1,
wherein the rotor of the hollow motor is substantially cylindrical in shape; and
wherein the hollow motor includes: a stator disposed around an outer circumference of the rotor; a motor housing accommodating therein the rotor and the stator; and first and second bearings disposed in the motor housing and supporting the rotor.

3. The power steering device according to claim 2,
wherein the rotor has: a large-diameter region formed at a middle thereof in the rotation axis direction of the input shaft and facing the stator; and first and second small-diameter regions formed on one side and the other side of the large-diameter region in the axis direction and made smaller in diameter than the large-diameter region;
wherein the stator extends to the one side and the other side of the large-diameter region in the axis direction;
wherein the first bearing is disposed between the first small-diameter region and the stator; and
wherein the second bearing is disposed between the second small-diameter region and the stator.

4. The power steering device according to claim 3,
wherein the hollow motor is in the form of a brushless motor having a resolver to detect a rotational position of the rotor; and
wherein the resolver is located outside the first bearing in the axis direction.

5. The power steering device according to claim 4,
wherein the motor housing has, formed on an inner circumferential side thereof, a first bearing accommodating part accommodating therein the first bearing;
wherein the resolver includes: a resolver rotor disposed around the outer circumference of the rotor; and a resolver stator disposed around the resolver rotor; and
wherein an outer diameter of the resolver rotor is set smaller than an inner diameter of the first bearing accommodating part.

6. The power steering device according to claim 5,
wherein a region of the rotor in which the resolver rotor is disposed is set smaller in outer diameter than a region of the rotor in which the first bearing is disposed.

7. The power steering device according to claim 2,
wherein at least one of the first and second bearings is in the form of a ball bearing adapted to restrict movement of the rotor in the axis direction.

8. The power steering device according to claim 1,
wherein the rotor of the hollow motor is substantially cylindrical in shape;
wherein the hollow motor includes: a stator arranged around an outer circumference of the rotor; and a motor housing accommodating therein the rotor and the stator; and
wherein the motor housing includes: a cylindrical member arranged radially outside the stator; and an axial end closing member closing a rotary-valve-side end of the cylindrical member.

9. The power steering device according to claim 1,
wherein the rotor of the hollow motor is substantially cylindrical in shape;
wherein the hollow motor is in the form of a brushless motor having: a stator arranged around an outer circumference of the rotor; a motor housing accommodating therein the rotor and the stator; and a resolver arranged on an side of the rotor opposite from the rotary valve in the axis direction so as to detect a rotational position of the rotor;
wherein the motor housing has a recessed engagement portion formed in a rotary-valve-side surface thereof in the axis direction so as to surround the input shaft;
wherein the power steering device further comprises a valve housing part accommodating therein the rotary valve; and
wherein the valve housing part has, formed on a motor-housing-side surface thereof, a protruding engagement portion engageable in the recessed engagement portion.

10. The power steering device according to claim 1,
wherein the input-shaft-side engagement part and the rotor-side engagement part are provided on only a rotary-valve-side region of the rotor in the axis direction.

11. The power steering device according to claim 1,
wherein the input-shaft-side engagement part and the rotor-side engagement part are formed with respective serrations and engaged with each other by the serrations.

12. The power steering device according to claim 11,
wherein there is a resin material filled in between the input-shaft-side engagement part and the rotor-side engagement part.

13. The power steering device according to claim 1,
wherein the input-shaft-side engagement part and the rotor-side engagement part are provided on a predetermined region of the rotor in the axis direction; and
wherein remaining regions of the input shaft and the rotor are formed with flat circumferential surfaces and adapted to allow contact between the flat circumferential surfaces along entire circumferences thereof.

14. The power steering device according to claim 1,
wherein there is provided a torque limiter between the input-shaft-side engagement part and the rotor-side engagement part.

15. The power steering device according to claim 1,
wherein the rotor of the hollow motor is substantially cylindrical in shape;
wherein the hollow motor includes a plurality of stator elements having respective coils wound around the outer circumference of the rotor; and
wherein the power steering device further comprises different energization circuits to which the coils of the stator elements are connected, respectively.

16. The power steering device according to claim 1, further comprising:
a ball screw mechanism arranged between the output shaft and the piston so as to convert rotation of the output shaft to movement of the piston in the axis direction;
rack teeth formed integral with the piston; and
a sector shaft engaged with the rack teeth so as to rotate with movement of the rack teeth and transmit rotation to steerable wheels via pitman arms,
wherein the rotary valve is arranged between the hollow motor and the power cylinder.

17. A power steering device, comprising:
an input shaft rotated in response to a steering operation of a steering wheel;
an output shaft coupled to the input shaft through a torsion bar;
a power cylinder having a pair of hydraulic pressure chambers defined by a piston to generate a steering assist force based on hydraulic pressures in the hydraulic pressure chambers;
a rotary valve that selectively supplies hydraulic fluid from an external hydraulic pressure source to the pair of hydraulic pressure chambers in accordance with relative rotation of the input shaft and the output shaft;

a hollow motor arranged to surround at least an axial portion of the input shaft and control rotation of the input shaft based on driving conditions of the vehicle;

input-shaft-side and rotor-side engagement parts arranged between an outer circumference of the input shaft and an inner circumference of the hollow motor so as to allow relative movement of the input shaft and a rotor of the hollow motor in an axis direction but to restrict relative movement of the input shaft and the rotor of the hollow motor in a rotation direction; and a controller that performs drive control of the hollow motor based on information from a camera that recognizes another vehicle travelling ahead or white lines on a travelling lane, information from a car navigation system or information from a yaw rate sensor that detects a yaw moment of the vehicle.

18. The power steering device according to claim 17, wherein the rotor of the hollow motor is substantially cylindrical in shape; and wherein the hollow motor includes: a stator arranged around an outer circumference of the rotor; a motor housing accommodating therein the rotor and the stator; and first and second bearings disposed in the motor housing and supporting the rotor.

19. The power steering device according to claim 18, wherein the rotor has: a large-diameter region formed at a middle thereof in the rotation axis direction of the input shaft and facing the stator; and first and second small-diameter regions formed on one side and the other side of the large-diameter region in the axis direction and made smaller in diameter than the large-diameter region;

wherein the stator extends to the one side and the other side of the large-diameter region in the axis direction;

wherein the first bearing is disposed between the first small-diameter region and the stator; and wherein the second bearing is disposed between the second small-diameter region and the stator.

20. The power steering device according to claim 19, wherein the hollow motor is in the form of a brushless motor having a resolver to detect a rotational position of the rotor; and wherein the resolver is located outside the first bearing in the axis direction.

* * * * *